(12) United States Patent
Green

(10) Patent No.: US 7,423,523 B2
(45) Date of Patent: Sep. 9, 2008

(54) COMPOSITE PLY LAYUP USING ELECTRONICALLY IDENTIFIABLE TAGS

(75) Inventor: Craig B. Green, Maryland Heights, MO (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 11/196,195

(22) Filed: Aug. 3, 2005

(65) Prior Publication Data

US 2007/0236354 A1 Oct. 11, 2007

(51) Int. Cl.
*B60Q 1/00* (2006.01)

(52) U.S. Cl. ............... 340/436; 340/539.1; 340/539.13; 340/572.1; 340/686.1; 340/686.2; 340/686.4

(58) Field of Classification Search ............... 340/436, 340/539.1, 539.13, 572.1, 686.1, 686.2, 686.4, 340/825.36, 825.49, 539.23, 568.1, 693.9
See application file for complete search history.

(56) References Cited

U.S. PATENT DOCUMENTS

| 6,212,762 | B1 * | 4/2001 | Lucier | 29/701 |
| 6,693,512 | B1 * | 2/2004 | Frecska et al. | 340/10.1 |
| 6,829,520 | B1 | 12/2004 | Green | |
| 6,943,688 | B2 * | 9/2005 | Chung et al. | 340/572.7 |
| 6,963,282 | B1 * | 11/2005 | Yeates et al. | 340/572.4 |

OTHER PUBLICATIONS

"RFID Embedded Materials", Craig B. Green, U.S. Appl. No. 10/810,105, filed Mar. 26, 2004.

* cited by examiner

*Primary Examiner*—Daryl C Pope
(74) *Attorney, Agent, or Firm*—Wildman, Harrold, Allen & Dixon, LLP

(57) ABSTRACT

A system and method of performing a ply layup for a composite panel is provided. The system and method may include attaching an electronically identifiable tag to at least one of a plurality of plies, and checking, using the electronically identifiable tag, to ensure the proper sequence of plies for the panel is being followed.

13 Claims, 4 Drawing Sheets

COMPOSITE PLY LAYUP USING ELECTRONICALLY IDENTIFIABLE TAGS

BACKGROUND OF THE INVENTION

1. Field of the Invention

The invention is related generally to systems and methods for manufacturing composite structures, and more specifically, is related to methods and apparatuses for performing layup operations to manufacture composite structures, such as, for example, composite resin matrix structures.

2. Background Description

The use of composite structures in fields such as the aerospace industry has become increasingly prevalent due to the desirable properties of composites; especially low weight, high strength and stiffness, and resistance to corrosion, among other properties. Composite materials are now increasingly being used for many components, such as, for example, aircraft wing skins, engine nacelles, horizontal and vertical stabilizers, nose and tail cones, and other elements of the aircraft's primary structure, such as the fuselage.

Composite materials are also being used for secondary structural elements of aircraft, such as internal floor panels, wall panels, and similar structural elements. The advantageous properties of composites have increased aircraft performance benefits, including increased range, decreased fuel consumption, and greater payload. Added performance benefits guide the use of composites throughout the aerospace industry and other fields, such as, for example the automotive industry.

During manufacture of composite material structures, a ply layup operation typically involves using manual visual identification and inspection, sometimes assisted with an overhead laser projection system (such as those commercially available from Laser Projection Technologies and Virtek), in order to verify that each ply in a layup has been placed in a proper position and orientation, and in a proper sequence. However, when an error occurs in either sequence or orientation of a ply during the layup process, it is possible that the structural properties of the finished part may be unacceptably compromised. If detected, such a situation often results in scrapping a very expensive part, wasted labor hours, and an increased fabrication cycle time. If not detected, the error in layup may lead to a structural failure of a finished part.

The present invention is directed to overcoming one or more of the problems or disadvantages associated with the prior art.

SUMMARY OF THE INVENTION

In accordance with one aspect of the invention, a method of performing a ply layup for a composite panel is provided. The method includes attaching an electronically identifiable tag to at least one of a plurality of plies, placing each ply in position to build the panel, checking, using the electronically identifiable tag, to ensure the proper sequence of plies for the panel is being followed, and providing an indication of whether the proper sequence of plies has been executed based on the information provided by the electronically identifiable tag.

The method may include determining whether the orientation of plies is acceptable, based on information provided by the electronically identifiable tag and/or providing an indication of whether the orientation of each ply having an electronically identifiable tag attached thereto is in a proper orientation. Each electronically identifiable tag may be a radio frequency identification (RFID) tag, and may be embedded within a ply, or may be placed on a surface of a ply.

According to another aspect of the invention, a composite panel includes a plurality of plies made from a composite material. The plurality of plies includes at least one ply having an electronically identifiable tag attached thereto. At least one electronically identifiable tag may be positioned in a location that may be trimmed from the composite panel, and/or may be embedded within a ply. Alternatively, the electronically identifiable tag may be placed on a surface of the ply.

According to yet another aspect of the invention, a method of performing a ply layup for the manufacture of a composite pane is provided. The method includes attaching an electronically identifiable tag to at least one of a plurality of plies, placing each of the plurality of plies in a predetermined position to build the panel, checking, using the electronically identifiable tag, to ensure that each ply with an attached electronically identifiable tag is placed in a proper orientation, and providing an indication of whether each ply with an attached electronically identifiable tag is placed in a proper orientation based on the information provided by the electronically identifiable tag.

The features, functions, and advantages can be achieved independently in various embodiments of the present invention or may be combined in yet other embodiments.

DETAILED DESCRIPTION

According to one aspect of the invention, a simple, accurate, and highly automated method and apparatus is provided for identifying composite plies and insuring a correct layup sequence, as well as a correct location and orientation are used during panel fabrication.

Figure 1:
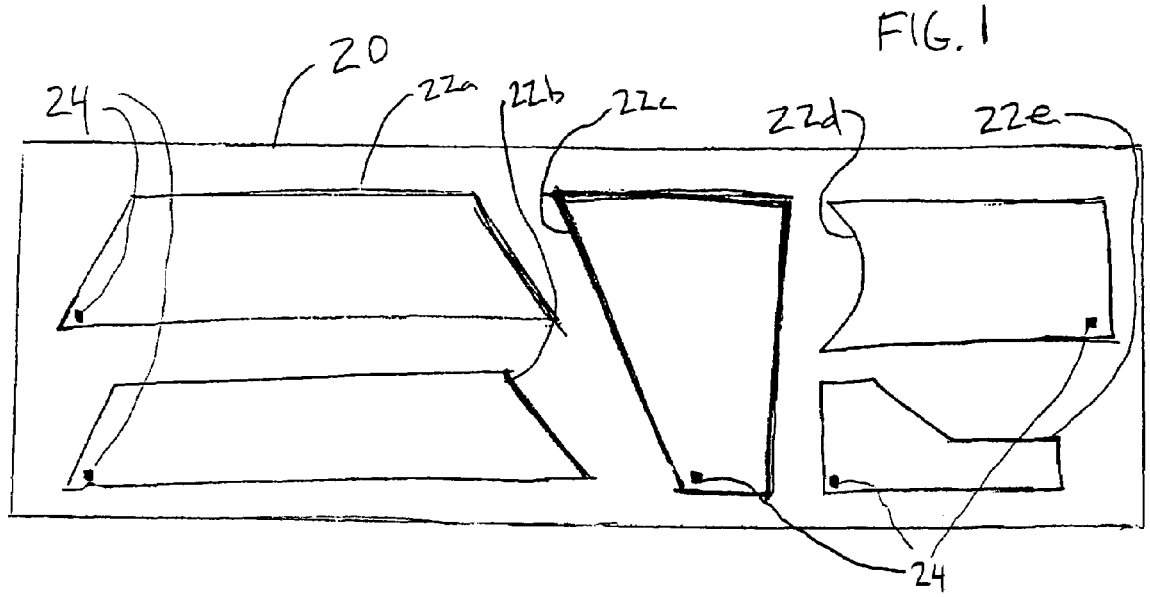
FIG. 1 is a diagrammatic plan view of a ply cutter bed and cut plies with electronically identifiable tags affixed thereto.

With reference initially to FIG. 1, a ply cutter bed 20 is shown in a diagrammatic plan view, supporting a plurality of cut plies 22a-22e. One or more of the cut plies 22a-22e may each have an electronically identifiable tag 24 affixed thereto. Each electronically identifiable tag 24 may include, for example: marks or dots painted or affixed on one or more of the plies 22a-22e, that may be detected by a vision system/optical sensor; a radio frequency identification (RFID) tag; another passive electronic tag device; and/or an active electronic tag device, such as, for example, an active radio transponder. Each electronically identifiable tag 24 may be attached to a surface of one or more of the plies 22a-22e, or, alternatively, may be embedded within one or more of the plies 22a-22e, and such attachment or embedding may take place before, during, or after a cutting operation used to form each ply 22a-22e.

Figure 2:
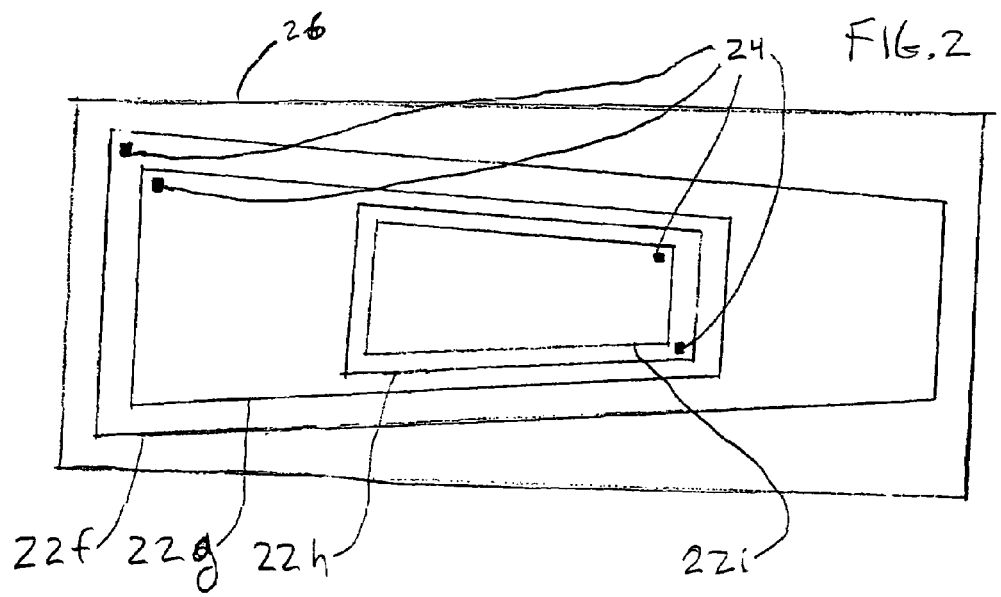
FIG. 2 is a diagrammatic plan view of a ply layup including multiple plies on a die/mold with electronically identifiable tags affixed to each ply.

FIG. 2 shows a diagrammatic plan view of a die/mold 26 having a plurality of cut plies 22f-22i arranged thereon in an exemplary layup configuration. As can be seen in FIG. 2, the electronically identifiable tags 24 may be affixed to each ply in a predetermined position, such that when each of the plies 22*f*-22*i* is placed on the die/mold 26, the position and sequence placement of each of the electronically identifiable tags 24 with respect to one another may be used to determine whether each of the plies 22*f*-22*i* has been placed in an appropriate sequence, position, and orientation to achieve a desired layup configuration.

Figure 3:
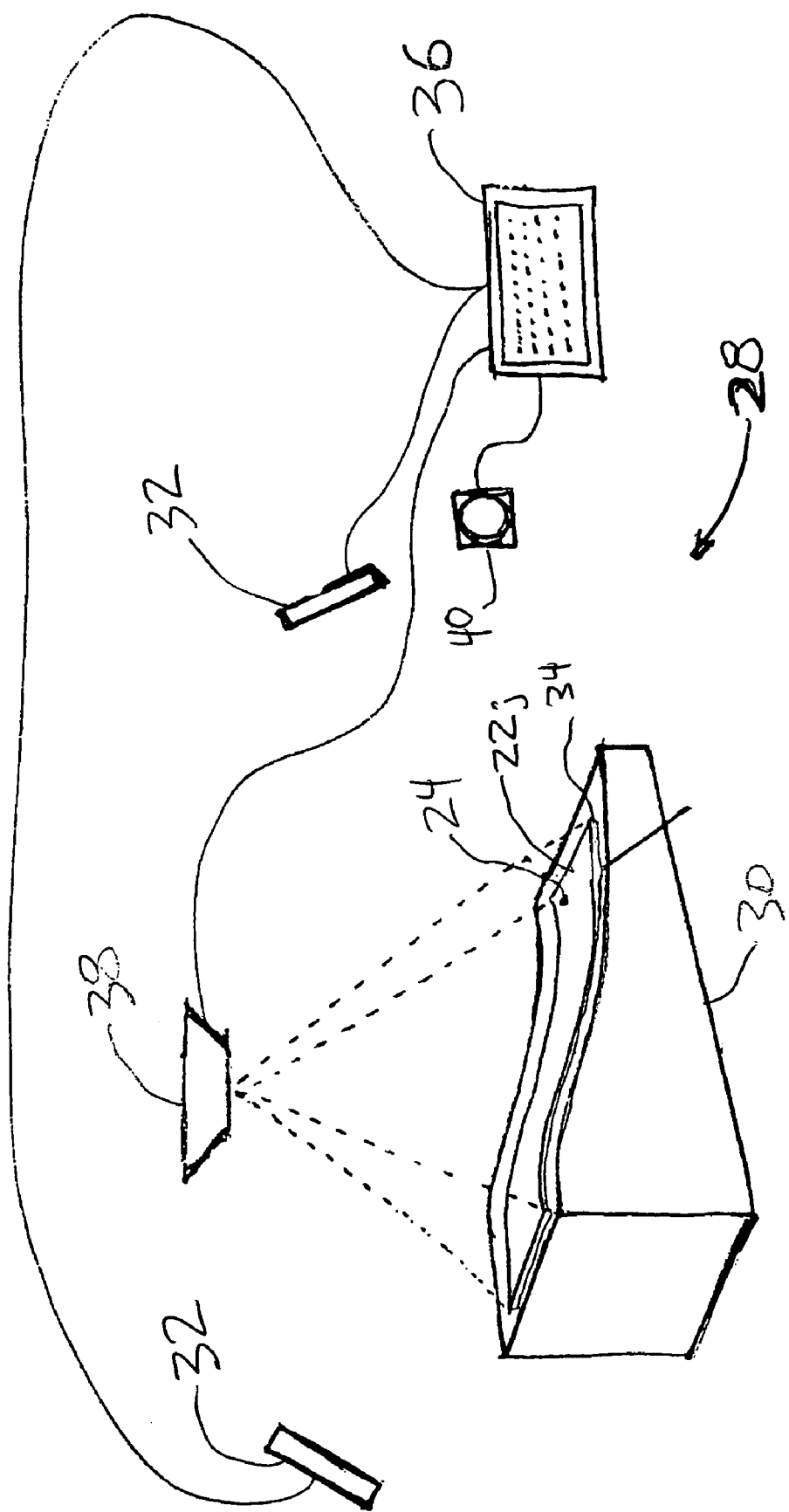
FIG. 3 is a diagrammatic perspective view of a layup apparatus according to one aspect of the invention.

FIG. 3 shows a diagrammatic perspective view of a ply layup orientation detection system, generally indicated at 28. The ply layup orientation detection system 28 may include a layup table 30 that may have a contour or shape that approaches the desired contour or shape of a finished part to be manufactured. One or more tag sensors 32 may be provided in the vicinity of the layup table 30, and a ply 22*j* of composite material that forms part of a composite panel 34 is shown that may have affixed thereto an electronically identifiable tag 24.

The ply layup orientation detection system 28 may further include a numerically controlled (NC) cutting machine (not shown). Each electronically identifiable tag 24 may be affixed to a ply, for example, placed on or embedded within a ply, as the ply is cut out from a pattern (e.g., on a GERBER® NC cutting machine). Alternatively, each electronically identifiable tag 24 may be affixed to a ply tab that is not meant to be included in the finished part, and that may be trimmed once a part is formed from the plies. The NC cutting machine may be retro fitted and/or programmed to add placing each electronically identifiable tag 24 onto/into each ply as a part of normal operation, with the association between each electronically identifiable tag 24 and the specific ply to which the electronically identifiable tag 24 is associated recorded and maintained in a computer data base. As noted above, each electronically identifiable tag 24 may reside on/in the finished production panel or, alternatively, onto an excess tab portion for subsequent removal/trimming before the panel 34 is processed further after layup (e.g., before curing of the panel 34 in an autoclave).

As the panel 34 is being built, an operator (human or electronic) may be directed by a computer system 36 to select a first ply, such as the ply 22*j*, and to place it on the layup table 30. Each tag sensor 32 located in the vicinity of the layup table 30 may be operatively connected to the computer system 36, and may scan/read each electronically identifiable tag 24 in the each ply, such as the ply 22*j*, and transmit appropriate data to the computer system 36 to confirm that each ply is being placed in a proper layup sequence and orientation The computer system 36 may further be operatively connected to a laser projector 38 to display a proper orientation for the ply (e.g., by projecting an outline of the ply) on the layup table 30. If an incorrect one of the plies is selected or the ply that was placed on the layup table 30 is in an improper location and/or orientation, the computer system 36 may be programmed to display a warning to the operator to correct the position and/or orientation of the ply 22*j*, to actuate a warning device 40 (that may include a flashing light and/or an audible alarm device), and/or to prevent subsequent displays by the laser projector 38, until such a corrective action has been taken.

Figure 4:
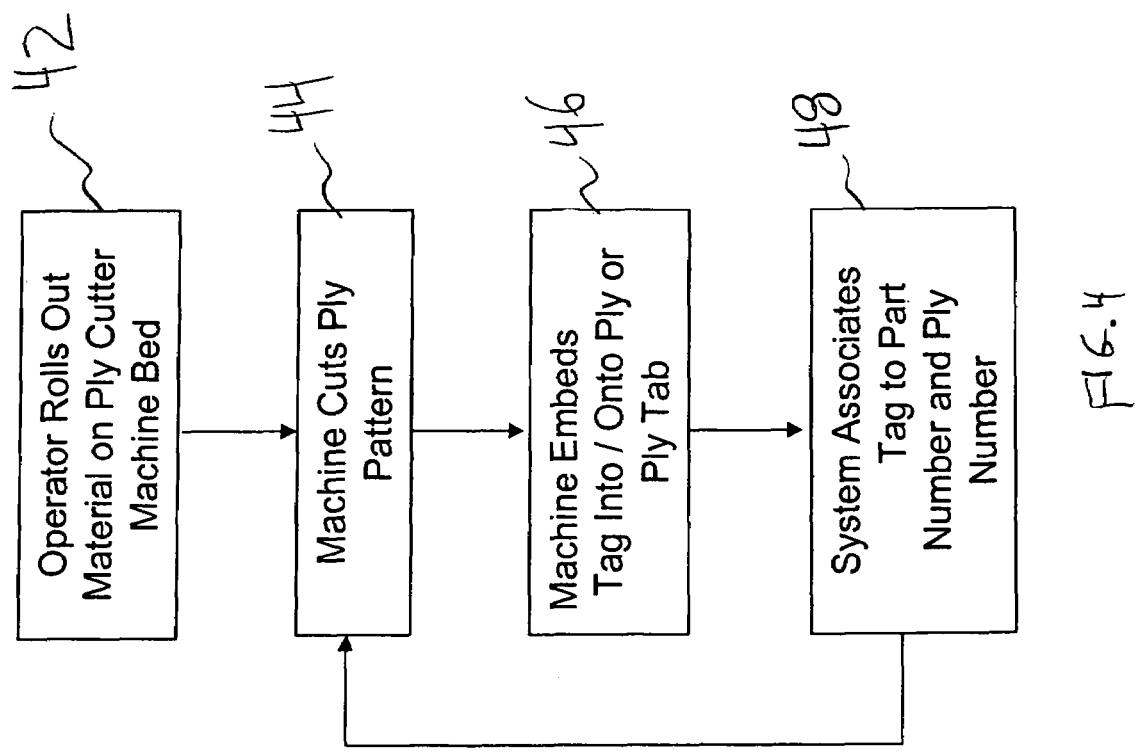
FIG. 4 is a flow diagram illustrating a method of cutting plies and affixing electronically identifiable tags to plies and/or to tabs associated with plies.

With reference to the flow diagram of FIG. 4, an example of a process for associating each electronically identifiable tag 24 with a ply may include rolling out material on a ply cutter machine bed, as indicated at 42. Then, the ply pattern may be cut at 44, and a tag may be affixed to one or more of the plies, as indicated at 46. Next, at 48 the computer system 36 may associate each electronically identifiable tag 24 with a part number and a ply number.

Figure 5:
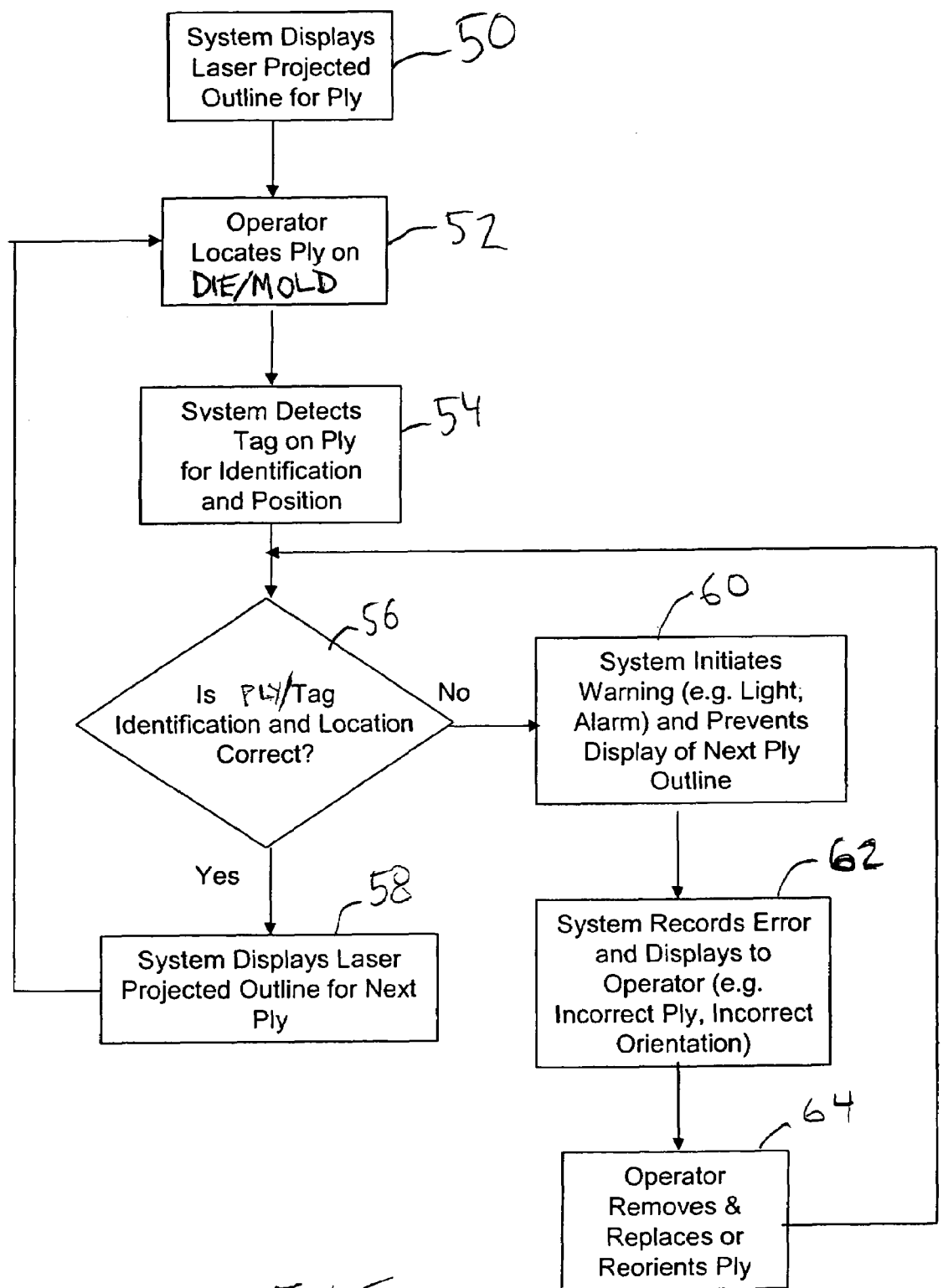
FIG. 5 is a flow diagram illustrating a method of performing a ply layup for a composite panel.

As shown in the flow diagram of FIG. 5, the following layup procedure may be used in conjunction with the apparatus shown in FIG. 3. As indicated at 50, the computer system 36 and the laser projector 38 may be used to project an outline showing the proper positioning of a ply on the layup table 30. Then the operator locates the ply on the layup table 30 in accordance with the projected outline at 52. Next, the computer system 36 and the tag sensors 32 may be used to detect the identification and position of the ply, as indicated at 54. At 56, the computer system 36 determines whether the identification and location of the ply detected at 54 is correct. If the identification and location of the ply detected at 54 is correct, the computer system 36 and laser projector 38 display a laser projected outline for the next ply, as indicated at 58. If the identification and location of the ply detected at 54 is not correct, the system may initiate a warning (e.g., via the warning device 40) and may prevent the display of the next ply outline, as indicated at 60. Next, the computer system 36 may record an error and may display an error message to the operator, as indicated at 62. At 64, the operator may remove and replace and/or reorient the ply, and the process may continue with a determination of whether the identification and location of the ply detected at 54 is correct, again, as indicated at 56.

Benefits of the invention include the ability to quickly and accurately ensure that proper composite part layup operations are performed in a highly automated process and/or in a manual layup process. The invention helps to eliminate costly production processing errors by preventing improper layups. Use of the invention should result in reduced non-conformance, reduced scrap part rates, and reduced cycle time, thus reducing the overall cost of producing high quality composite structures.

Other aspects and features of the present invention can be obtained from a study of the drawings, the disclosure, and the appended claims.

What is claimed is:

1. A method of performing a ply layup for composite panel, the method comprising:
   attaching an electronically identifiable tag to at lease of a plurality of plies;
   placing each ply in position to build the panel;
   checking, using the electronically identifiable tag, to ensure the proper sequence of plies for the panel is being followed; and
   providing an indication of whether the proper sequence of plies has been executed based on the information provided by the electronically identifiable tag.

2. The method of claim 1, further including:
   determining whether the orientation of plies is acceptable, based on information provided by the electronically identifiable tag.

3. The method of claim 1, further including:
   providing an indication of whether the orientation of each ply having an electronically identifiable tag attached thereto is in a proper orientation.

4. The method of claim 1, wherein each electronically identifiable tag is embedded within a ply.

5. The method of claim 1, wherein the electronically identifiable tag is placed on a surface of a ply.

6. The method of claim 1, wherein the electronically identifiable tag is a radio frequency identification tag.

7. A composite panel, comprising:
   a plurality of plies made from a composite material;
   wherein said plurality of plies includes at least one ply having an electronically identifiable tag attached thereto, and wherein when said plurality of plies were placed in position to build the panel, the electronically identifiable tag was used to check that the proper sequence of plies had been followed, and an indication was made that the proper sequence of plies had been executed based on information provided by the electronically identifiable tag.

8. The composite panel of claim 7, wherein at least one electronically identifiable tag is positioned in a location that may be trimmed from the composite panel.

9. The composite panel of claim 8, wherein each electronically identifiable tag is embedded with a ply.

10. The composite panel of claim 9, wherein the electronically identifiable tag is placed on a surface of the ply.

11. The composite panel of claim 9, wherein the electronically identifiable tag is a radio frequency identification tag.

12. A method of performing a ply layup for the manufacture of a composite panel, the method comprising:

attaching an electronically identifiable tag to at least one of a plurality of plies;

placing each of the plurality of plies in a predetermined position to build the panel;

checking, using the electronically identifiable tag, to ensure that each ply with an attached electronically identifiable tag is placed in a proper orientation; and providing an indication of whether each ply with an attached electronically identifiable tag is placed in a proper orientation based on the information provided by the electronically identifiable tag.

13. The method of claim 12, wherein the electronically identifiable tag is a radio frequency identification tag.

* * * * *